Patented Nov. 5, 1946

2,410,612

UNITED STATES PATENT OFFICE 2,410,612

CEMENTING COMPOUND

Nordahl L. Rude, Eau Claire, Wis.

No Drawing. Application February 8, 1944,
Serial No. 521,581

2 Claims. (Cl. 106—253)

This invention appertains to a cementing compound to take the place of commercial putty, or the like, for caulking and glazing purposes.

Commercial putty, commonly employed for caulking and glazing purposes, dries very hard, and very frequently, when used for glazing purposes, causes glass to break, because it cannot "give" to the limit, thereby allowing freedom in change of position of glass, etc., without the least danger of breaking or cracking. Additionally, commercial putty, as well as certain other classes of caulking and glazing materials, or compounds, will crack, loosen and/or check, over periods of use and under various conditions of the weather.

The invention, therefore, has for an object to provide an improved cementing compound, which has been subjected to thorough test, with regard to durability and strength, under extremes of heat, cold, and moisture, and found to stand up, over long periods of time, without evidence of any cracking, loosening, chipping, or checking, whether applied to metal, glass, stone, or wood.

The components of the improved cement consist of asbestos fiber; linseed oil; pine tar; fine hair; and a base oxide, such as calcium oxide; the latter ingredient constituting the base material, it not only making the quantity but, also, determines the setting-up strength of the mixture and, otherwise, adjusts the combined materials to the proper finished product. The asbestos fiber acts to prevent the mixture from setting too hard and, otherwise, functions to retard, if not entirely prevent, undue expansion and contraction. The linseed oil acts as a binding agent and as a preserver, while the pine tar imparts to the mixture desired elastic and adhesive qualities and, otherwise, functions as a preservative. The fine hair also functions as a binder and tends to prevent the cement from checking; also, it imparts additional strength thereto.

The cement, knife grade, is to be compounded in accordance with the formula, as follows:

| | | |
|---|---|---|
| Asbestos fiber | pound | 1 |
| Raw linseed oil | quarts | 2 |
| Pine tar | ounces | 1½ |
| Fine soft hair | do | ¼ |
| Limate | pounds | 5 |

These ingredients are mixed in rotation, starting with the asbestos fiber, converted into a paste or "cement" by the addition thereto of water in suitable amount, and the mixing operation must be thorough and continuous as each of the other of the ingredients are added. The mixing will be performed mechanically, for instance, in putty chasers, consisting of large flat faced wheels rolling in steel circular troughs, by means of which the ingredients will be blended into a high-grade caulking and glazing cement of the highest quality. Gun grade cement may be made with all of the ingredients, with the exception of the calcium oxide, in the stated proportions, the proportion of the calcium oxide, however, will be varied in a lesser amount as may be required to obtain a desired degree of softness of the compound.

The cement, knife grade, is primarily for use with a putty knife on small jobs, and the gun grade is always required for large jobs. The cement can be applied on every conceivable surface. It can be used for filling cracks before painting the surfaces, to fill cracks in walls, around doors and windows, floors, etc. Glass in windows of all classes and descriptions, or in greenhouse frames, will be held permanently in place, by the application of the cement, gun grade, by gunning a ribbon of it around all sides of the panes of glass.

What I claim is:

1. A knife grade caulking and glazing cement, consisting of asbestos fiber in the form of an aqueous paste, 1 pound; raw linseed oil, 2 quarts; pine tar, 1½ ounces; fine soft hair, ¼ ounce; and calcium oxide, 5 pounds, blended together in the given order, during continuous agitation.

2. A gun grade caulking and glazing cement, consisting of asbestos fiber in the form of an aqueous paste, 1 pound; raw linseed oil, 2 quarts; pine tar, 1½ ounces; fine soft hair, ¼ ounce; and calcium oxide in sufficient amount, less than 5 pounds, to give desired gun extruding consistency.

NORDAHL L. RUDE.